United States Patent [19]
Park

[11] Patent Number: 5,906,558
[45] Date of Patent: May 25, 1999

[54] LIMITED SLIP DIFFERENTIAL FOR A VEHICLE

[75] Inventor: Byongkyun Park, Kyungki-do, Rep. of Korea

[73] Assignee: Hyundai Motor Company, Seoul, Rep. of Korea

[21] Appl. No.: 08/919,196

[22] Filed: Aug. 28, 1997

[30] Foreign Application Priority Data

Aug. 30, 1996 [KR] Rep. of Korea ...................... 96-36784

[51] Int. Cl.⁶ .................................................. F16H 48/10
[52] U.S. Cl. ........................................... 475/249; 475/248
[58] Field of Search .................................... 475/231, 234, 475/235, 240, 248, 249, 252, 253; 192/56.57, 35, 55.2, 54.52

[56] References Cited

U.S. PATENT DOCUMENTS

| | | | |
|---|---|---|---|
| 3,474,689 | 10/1969 | Young | 475/235 |
| 5,156,578 | 10/1992 | Hirota | 475/249 X |
| 5,269,730 | 12/1993 | Hirota | 475/249 X |
| 5,322,484 | 6/1994 | Reuter | 475/249 |
| 5,326,333 | 7/1994 | Niizawa et al. | 475/249 |
| 5,464,084 | 11/1995 | Aoki et al. | 475/249 X |

*Primary Examiner*—Charles A. Marmor
*Assistant Examiner*—Ankur Parekh
*Attorney, Agent, or Firm*—Birch, Stewart, Kolasch & Birch, LLP

[57] ABSTRACT

Disclosed is a limited slip differential connected to a transmission of a vehicle for distributing torque transmitted from the transmission to first and second drive wheels in accordance with a driving state of the vehicle. The limited slip differential includes a torque distributor for controlling a differential operation which suitably distributes torque of the transmission between the first and second wheels when turning the vehicle, the torque distributor including a torque input member connected to the transmission to receive torque therefrom, a first torque transmitting member transmitting torque from the torque input member to the first drive wheel, and a second torque transmitting member transmitting torque from the torque input member to the second drive wheel. The limited slip differential further includes a differential limiting device for limiting the differential operation of the torque distributor by rolling and contacting between the first and second torque transmitting members when either the first wheel or the second wheel is on a slippery surface.

5 Claims, 2 Drawing Sheets

LIMITED SLIP DIFFERENTIAL FOR A VEHICLE

FIELD OF THE INVENTION

The present invention relates to a limited slip differential for a vehicle disposed between a left and a right drive wheel of a vehicle or between front and rear wheels of a 4-wheel drive vehicle, which improves driving performance and ensures stability of the vehicle by suitably distributing torque transmitted from a transmission to each drive wheel.

BACKGROUND OF THE INVENTION

Because inner and outer wheels rotate at different speeds when turning a vehicle, torsion in the driving system negatively affects driving performance. Accordingly, a differential gear is used in the conventional powertrain. However, if one drive wheel is on a slippery surface, such as ice, snow, or mud, a coefficient of road surface friction decreases on the wheel and it can easily slip even with a small amount of torque. To prevent this problem, a limited slip differential is used.

A power lock-type limited slip differential is most commonly used. This type of differential uses a plurality of friction clutches to perform its slip-preventing function. As a result, the power lock-type limited slip differential has a complicated structure and is heavy.

In a 4-wheel drive vehicle, a specific tight corner braking phenomenon occurs due to a difference of radius of gyration between the front and rear wheels, and more particularly due to the difference of the number of rotations according to the big radius of gyration for the front wheel and the small radius of gyration for the rear wheel when turning the vehicle.

The difference of radius of gyration causes forced slipping of the wheels or torsion stress of the driving system in parts like the propeller shaft. This results in locking the driving system and thereby braking the vehicle. The braking of the driving system has a harmful influence upon rigidity of the propeller shaft and also on smooth turning of the vehicle, and causes loss of power.

As the rear wheels of the 4-wheel drive vehicle have small rotative speed slip because of the speed difference between the front and rear wheels when turning the vehicle, driving performance and stability of the vehicle deteriorate.

In addition, because torsion stress occurs while turning the vehicle causing the vehicle body to vibrate, when designing the vehicle, the size and weight of the propeller shaft should be increased to reduce vibration.

A center differential gear has been used to solve this problem. However, a lock system must additionally be mounted to temporarily stop the differential operation.

In recent years, a viscous coupling has been used to solve the problem. However the viscous coupling has a complex structure and increases manufacturing costs.

SUMMARY OF THE INVENTION

The present invention has been made in an effort to solve the above problems.

It is objective of the present invention to provide a limited slip differential for distributing torque transmitted from a transmission to drive wheels in accordance with a driving state of the vehicle.

To achieve the above object, the invention provides a limited slip differential connected to a transmission of a vehicle for distributing torque transmitted from the transmission to first and second drive wheels in accordance with a driving state of the vehicle. The limited slip differential includes torque distributing means for controlling a differential operation which suitably distributes torque of the transmission between the first and second wheels when turning the vehicle, the torque distributing means including a torque input member connected to the transmission to receive torque therefrom, a first torque transmitting member transmitting torque from the torque input member to the first drive wheel, and a second torque transmitting member transmitting torque from the torque input member to the second drive wheel. The limited slip differential further includes a differential limiting means for limiting the differential operation of the torque distributing means by rolling and contacting between the first and second torque transmitting members when either the first wheel or the second wheel is on a slippery surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings. which are incorporated in and constitute a part of the specification, illustrate an embodiment of the invention, and, together with the description, serve to explain the principles of the invention.

DETAILED DESCRIPTION OF PREFERRED EMBODIMENTS

In the following detailed description, only the preferred embodiment of the invention has been shown and described, simply by way of illustration of the best mode contemplated by the inventor of carrying out the invention. As will be realized, the invention is capable of modification in various obvious respects, all without departing from the invention. Accordingly, the drawings and description are to be regarded as illustrative in nature, and not as restrictive.

Figure 1:
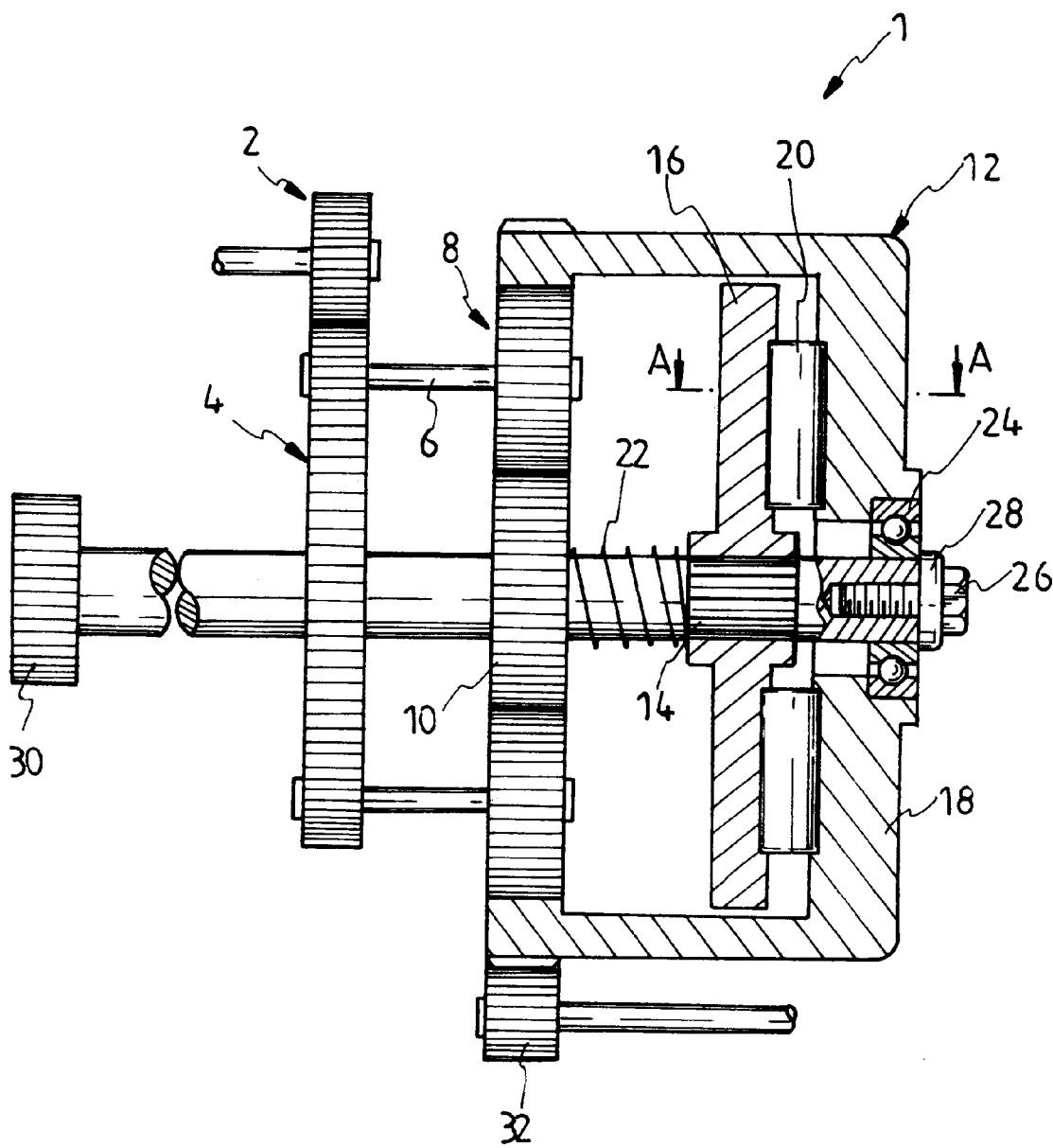
FIG. 1 is a sectional side view illustrating a limited slip differential between a first wheel and a second wheel in accordance with a preferred embodiment of the present invention.

Referring first to FIG. 1, there is illustrated a limited slip differential according to a preferred embodiment of the present invention, and reference numeral 1 denotes the limited slip differential.

The differential control unit 1 is a device for controlling a differential operation which suitably distributes torque between a left and a right drive wheel or between front and rear wheels in a 4-wheel drive vehicle to prevent torsion stress when the vehicle is turning, and for limiting slip by providing more driving force to a wheel with traction when one wheel is on a slippery surface.

The limited slip differential 1 comprises a torque transmission gear 2 for transmitting torque from a transmission, a carrier gear 4 which is engaged with the torque transmission gear 2, a plurality of pinion gears 8 which is mounted to freely rotate on a plurality of rods 6 displaced along a circumference of the carrier gear 4, a sun gear 10 for transmitting the torque transmitted from the pinion gears 8 to a first drive wheel through a torque transmission member 30, and a ring gear 12 for transmitting the torque to a second drive wheel through a torque transmission member 32.

The sun gear 10 is integrally formed with a spline shaft 14, and a cam disc plate 16 is splined-engaged with the spline shaft 14 to be rotationally fixed and able to move in a longitudinal direction thereon. The carrier gear 4 is provided on the spline shaft 14 such that the sun gear 10 is positioned between the carrier gear 4 and the cam disc plate 16, the carrier gear 4 being rotatably mounted on the spline shaft 14.

The ring gear 12 comprises a back plate 18 which is formed parallel to the cam disc plate 16, and a needle bearing 20 provided between the back plate 18 and the cam disc plate 16.

Each needle of the needle bearing 20 is circumferentially disposed therein. Accordingly, inner diameters of the needles are small, while outer diameters of the needles are relatively large. These needles are housed inside a housing (not shown) of the needle bearing 20 such that the needles remain firmly secured in their respective positions.

Figure 2:
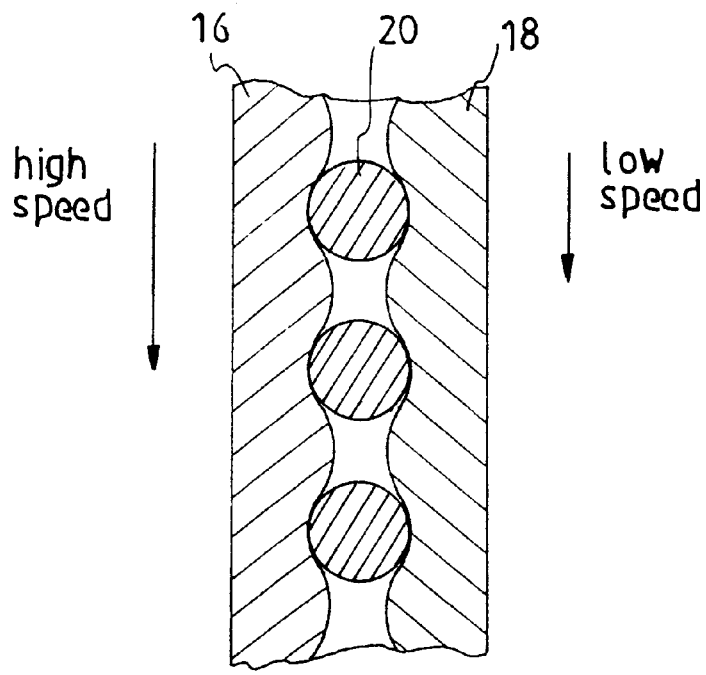
FIGS. 2 and 3 are sectional views taken along line A—A of FIG. 1 and which illustrate an operation of the limited slip differential shown in FIG. 1.

On surfaces of the cam disc plate 16 and the back plate 18 facing each other, grooves are formed to interpose the needles of the needle bearing 20, as shown in FIG. 2.

An elastic member such as a spring 22 is provided between the cam disc plate 16 and the sun gear 10 to bias the cam disc plate 16 toward the back plate 18.

The back plate 18 is supported to freely rotate on the spline shaft 14 by a bearing 24 which is fixed by a stopper 28 joined to the spline shaft 14 through a fastener such as a bolt 26.

The operation of the limited slip differential 1 structured as in the above w ill be described hereinbelow.

When the first and second drive wheels receive the same load, such as when the vehicle is driven in a straight line, as the carrier gear 4 starts to rotate in accordance with torque transmitted from the transmission, the sun gear 10 and the ring gear 12 rotate at the same rotative speed.

However, when the vehicle turns, the radius of gyration of the first and second drive wheels become s different and, accordingly, the sun gear 10 and the ring gear 12 have different rotative speeds. As a result, the pinion gear 8, which is mounted to freely rotate on the rod 6, rotates to control the relative speed difference.

The above process is similar to a process of a planetary gearset. That is, the carrier gear 4 connected with the pinion gear 6 acts as an input element and the sun gear 10 and the ring gear 12 act as output elements.

Through the above planetary gearset operating process, more torque is able to be distributed toward the wheel rotating at a faster speed.

As described in the above, as a difference in rotative speed is generated between the sun gear 10 and the ring gear 12 when turning the vehicle, a difference in rotative speed is also generated between the cam disc plate 16 connected to the sun gear 10 a nd the back plate 18 of the ring gear 12.

Figure 3:
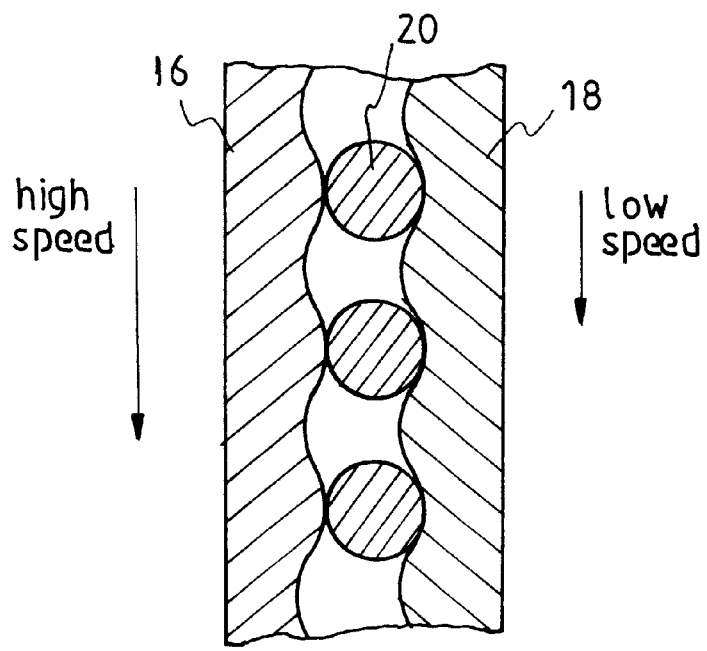

Referring now to FIGS. 2 and 3, there are shown sectional views taken along line A—A of FIG. 1. In the drawings, relative movement between the cam disc plate 16, the needle bearing 20 and the back plate 18 is shown when there is a difference in rotative speeds of these elements.

If the cam disc plate 16 rotates more quickly than the back plate 18 of the ring gear 12, as shown in FIG. 3, the cam disc plate 16 rotates on the needle bearing 20. This process is smoothly realized by rotation of the plurality of needles in the needle bearing 20 and by the spring 22 which elastically supports the cam disc plate 16 splined-engaged with the spline shaft 14. Accordingly, this difference in rotative speed of the cam disc plate 16 and the back plate 18 of the ring gear 12 allows the differential operation to be realized.

In the rotation of the cam disc plate 16 on the needle bearing 20 as described above, as the needle bearing 20 is interposed between valleys and peaks of the grooves formed on surfaces of the cam disc plate 16 and the back plate 18, more force of the spring 22 is given to the cam disc plate 16 when the needle bearing 20 is positioned in the peaks than when the needle bearing 20 is positioned in the valleys. This force acts to reduce the difference in rotative speed of the cam disc plate 16 and the back plate 18.

Therefore, when there is a very large difference in rotative speed between the cam disc plate 16 and the back plate 18, such as when one drive wheel is on a slippery surface, the needle bearing 20 transmits larger force between the cam disc plate 16 and the back plate 18 to limit slip.

The above process is summarized hereinbelow.

When the vehicle is driven in a straight line, the first and second wheels rotate at the same speed and no difference in rotative speed is generated between the cam disc plate 16 and the back plate 18 such that the needle bearing 20 is not operated.

When the vehicle is turning, a difference in rotative speed is generated between the first and second wheel, and the cam disc plate 16 and the back plate 18 rotate at different speeds by rotation of the needle bearing 20 and elasticity of the spring 22.

When either the first or second wheel begins to spin as a result of being on a slippery road surface, as the cam disc plate 16 and the back plate 18 come to rotate at significantly different speeds, the cam disc plate 16 rotates more frequently on the needle bearing 20 such that the needle bearing 20 transmits a larger force between the yam disc plate 16 and the back plate 18 to limit a differential operation.

As a result, through the operation of the needle bearing 20 in accordance with a driving state of the vehicle, driving performance and stability of the vehicle are improved.

The present invention realizes a torque distributing function, a differential function and a differential limiting function by a device having a simple structure. Therefore, it is able to reduce both the weight of the vehicle and manufacturing costs.

The limited slip differential in accordance with the present invention can be used for a limited slip differential mounted between right and left drive wheels of a vehicle or for a center limited slip differential mounted between front and rear wheels of a 4-wheel drive vehicle, and, can even be used by combining two or more limited slip differentials.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, and defined in the appended claims.

What is claimed is:

1. A limited slip differential connected to a transmission of a vehicle for distributing torque transmitted from the transmission to first and second drive wheels in accordance with a driving state of the vehicle, comprising:

a torque input member connected to the transmission to receive torque therefrom;

torque distributing means for controlling a differential operation which suitably distributes torque of the transmission the torque distributing means including:

a first torque transmitting member transmitting torque from the torque input member;

a second torque transmitting member transmitting torque from the torque input member;

a planetary gearset comprising a sun gear, a ring gear, and a plurality of pinion gears connected to a carrier gear, one of said sun gear, ring gear and carrier gear acting as an input element connected to said torque input member and the remaining two gears acting as output elements connected to the respective one of said first and second torque transmitting members; and differential limiting means for limiting the differential operation of the torque distributing means by rolling and contacting between the first and second torque transmitting members.

2. The limited slip differential of claim 1, wherein said carrier gear acts as an input element.

3. The limited slip differential of claim 1, wherein said differential limiting means comprises a back plate integrally formed with the first torque transmitting member, a disc plate spline-engaged with the second transmitting member, and rolling contact means for contacting and rolling between said back plate and disc plate, and an elastic member for biasing the back plate toward the disc plate or the disc plate toward the back plate.

4. The limited slip differential of claim 3, wherein the rolling contact means is a needle bearing.

5. The limited slip differential of claim 3, wherein grooves are formed on surfaces of the back plate and disc plate facing each other to interpose the rolling contact means.

* * * * *